T. MAITLAND.
Spring-Whiffletree.

No. 214,674.      Patented April 22, 1879.

Attest:
Clarence Poole
R. N. Dyer.

Inventor:
Thomas Maitland
by Geo. W. Dyer Co.
Atty.

UNITED STATES PATENT OFFICE.

THOMAS MAITLAND, OF WILLIAMSPORT, PENNSYLVANIA.

IMPROVEMENT IN SPRING-WHIFFLETREES.

Specification forming part of Letters Patent No. 214,674, dated April 22, 1879; application filed March 20, 1879.

*To all whom it may concern:*

Be it known that I, THOMAS MAITLAND, of Williamsport, in the county of Lycoming and State of Pennsylvania, have invented a new and useful Improvement in Spring-Whiffletrees; and I do hereby declare that the following is a full and exact description of the same, reference being had to the accompanying drawings, and to the letters of reference marked thereon.

The object I have in view is an improved spring-whiffletree which will relieve the shoulders of the horse and the parts of the vehicle from the strain of sudden jolts in passing over rough roads and in starting, and will also add to the comfort of the occupants of the vehicle, such whiffletree being simpler and lighter than the spring-whiffletrees heretofore proposed, and more efficient in use; and my invention therein consists in the combination of a bar pivoted centrally to the draft-bar of a vehicle, and having its rear side curved outwardly at the center, a plate-spring secured to the rear curved side of the pivoted bar and bent at its ends away from such bar, and extending beyond the ends of the pivoted bar for attachment with the tugs and short end springs secured between the bar and the main spring, for giving additional resistance to the pull of the tugs, as fully hereinafter explained.

Figure 1:
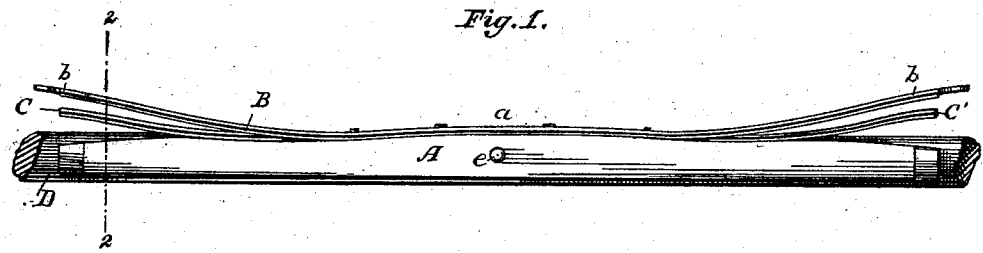
Figure 2:
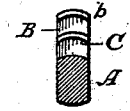

In the drawings, Figure 1 is a top view of the spring-whiffletree pivoted in position on the draft-bar of a vehicle; and Fig. 2, a section of the whiffletree on the line 2 2.

A is a wooden bar, of less length than the distance between the shafts of a vehicle, and somewhat shorter than the ordinary whiffletree. Its front side is preferably straight, or nearly so; but its rear side, $a$, is curved outwardly, as shown, the ends of the bar being considerably narrower than the center. This rear side is also of convex form, for a purpose to be presently described. The tips of the bar A may have rings or ferrules placed upon them.

Secured to the rear side of the bar A is a long plate-spring, B, having a curve in the opposite direction to that of the bar. This spring is only attached to the bar at its central portion, its ends $b$ being free and projecting off from the bar, as shown. These ends $b$ extend beyond the ends of the bar B sufficiently to allow of the attachment of the tugs to the spring B outside of the ends of the bar. The ends $b$ may be notched or hooked for connection with the tugs, or they may be provided with snap-hooks for the same purpose. By having the pivoted bar shorter than the distance between the shafts, and extending the spring beyond the ends of such bar, the tugs can be attached directly to the ends of the spring without using forwardly-projecting links to connect the tugs and spring. The bar, also, is lighter, and the single-tree is made cheaper and of more compact and neater appearance.

Between the ends $b$ of the spring B and the bar A are placed two short springs, C C', secured at their inner ends to the bar A, and projecting off from such bar in about the same direction as the ends $b$. The spring B, when drawn upon by the tugs, bears upon the short springs C C', and is partly supported thereby.

The spring B and the short springs C C' are made curved in cross-section, as shown, whereby they are much stiffer, and play more readily upon each other and upon the bar A. This curvature of the springs and the bar also keeps the springs in position, and prevents any vertical movement. The bar A is pivoted by a bolt, $e$, at its center to the draft-bar D of a vehicle, as shown in the drawings.

The whole device is cheap and light, the structure of the springs and the diverging curves of the springs and bar enabling light springs to be used. The whole whiffletree being pivoted to the draft-bar relieves the strain upon the horse and the vehicle, in addition to the action of the springs.

What I claim as my invention is—

The combination of the pivoted bar A, having curved rear side, with the oppositely-curved springs B, extending beyond the ends of the bar, and the short end springs C C', substantially as described and shown.

This specification signed and witnessed this 1st day of March, 1879.

THOMAS MAITLAND.

Witnesses:
  W. T. ANDREWS,
  L. W. DIMOCK.